UNITED STATES PATENT OFFICE 2,121,928

ANTHRAQUINONE DYESTUFFS AND PROCESS FOR THEIR MANUFACTURE

Albin Peter, Basel, Switzerland, assignor to the firm Chemical Works, formerly Sandoz, Basel, Switzerland No Drawing. Application March 13, 1935, Serial No. 10,938. In Germany March 21, 1934

15 Claims. (Cl. 260—60)

The present invention relates to new anthraquinone dyestuffs and to a process for their manufacture.

It has been found that new valuable dyestuffs of the anthraquinone series can be prepared by condensing aromatic amines of the general formula

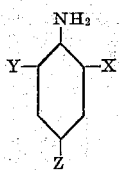

wherein X and Y represent alkyl and halogen and Z represents hydrogen, alkyl, halogen or alkoxy, with such anthraquinone compounds that contain at least one group replaceable by an aromatic amine.

The aromatic amines useful for the production of the new anthraquinone dyestuffs are for example 1-amino-2,4,6-trimethylbenzene, 1-amino-2,6-dimethylbenzene, 1-amino-2,4-dimethyl-6-bromobenzene, 1-amino-6-ethyl-2,4-dimethylbenzene or the like.

As anthraquinone compounds which can be used in the present process, the following may be listed:

The alphaaminoanthraquinones, their homologues and derivatives, halogenated in an α-position, such as 1-amino-4-bromo-anthraquinone, 1-amino-4-chloro-anthraquinone, 1-amino-2-methyl-4-bromo-anthraquinone, 1-amino-2-sulpho-4-bromo-anthraquinone, 1-methylamino-4-bromo-anthraquinone, 1-amino-2,5-disulpho- or 2,8-disulpho-4-bromo-anthraquinone, 1-amino-2-carboxy-4-bromo-anthraquinone, 1-amino-2-cyano-4-bromo-anthraquinone, 1-amino-5-chloro-anthraquinone, 1-amino-2-methoxy-4-bromo-anthraquinone, 1-amino-2-phenoxy-4-bromo-anthraquinone and so on.

Further, the mono- and dihalogenanthraquinones containing at least one halogen atom in an α-position and their substitution products such as 1-amino-2,4-dibromo-anthraquinone, 1-amino-5- or -6- or -7- or -8-sulpho-2,4-dibromo-anthraquinone, 1-amino-2,4-dibromo-5-chloro-anthraquinone, 1,4- or 1,5- or 1,8- or 1,7- or 1,6-dichloro-anthraquinone, 1-chloro-anthraquinone, 1,3-dibromo-anthraquinone.

Further, the derivatives of α-hydroxyanthraquinones, such as the leuco-1,4-dihydroxyanthraquinone.

Finally, the anthrapyridones containing at least one halogen atom in an α-position, such as N-methyl-4-bromo-anthrapyridone, C - carbethoxy- or C-acetyl-2-methyl-4-bromo-anthrapyridone, or 2,4-dibromo-anthrapyridone.

The condensation of the anthraquinone derivatives with the aromatic bases of the above cited configuration is generally carried out in presence of a solvent and a catalyst, at temperatures between 50° and 250° C., and in an open or in a closed vessel. As suitable solvents the following, or mixtures thereof, can be used: water, ethanol, methanol, chlorobenzene, nitrobenzene, dimethylaniline, phenol, glacial acetic acid and the o,o-disubstituted aromatic bases themselves, when they are used in excess.

As catalyst generally finely divided copper or copper salts are used, but it is also possible to carry out the condensation in absence of copper.

Sometimes it is advantageous to carry out the condensation in an inert atmosphere, for example in nitrogen or carbon dioxide atmosphere, preferably under addition to the reaction mixture of acid-binding agents, such as sodium-, potassium- or ammonium-acetate, sodium- or potassium-carbonate or bicarbonate, soap and the like.

The condensation products obtained according to the present process are, when they are not sulphonated, valuable compounds for the dyeing of lacquers, like nitrocellulose lacquers, or of cellulose esters and ethers.

If it is intended to obtain water-soluble dyestuffs, the condensation products obtained as above described are subjected to a sulphonation process, which may be carried out by different methods. If the condensation products contain in their molecule a group that can be replaced by the sulphonic acid group, as is the case in the β-halogen derivatives, then they are transformed into water-soluble dyestuffs by heating them with sulphites, whereby the halogen becomes replaced by the sulphonic acid group.

But it is possible to prepare water soluble dyestuffs from water-insoluble condensation products by sulphonating them with sulphuric acid or fuming sulphuric acid of an appropriate concentration of $SO_3$ or with chlorosulphonic acid, whereby one or more sulphonic acid groups will be introduced into the aryl or into the anthraquinone nucleus. It is also possible to combine both sulphonation methods, that is the direct sulphonation in the aryl nucleus and the subsequent introduction of sulphonic acid group by the sulphite method. These sulphonation methods are well known in the art and can be carried out in the usual manner.

By subjecting the sulphonated or unsulphonated condensation products containing a free p-position to the imino group in the aryl radical to the action of aldehydes such as formaldehyde, acetaldehyde, benzaldehyde, benzaldehyde-disulphonic acid etc. in an acid or neutral medium, di- and triarylmethane derivatives can be produced. By treating the above mentioned compounds with oxidizing agents such as nitric acid, peroxide of manganese and the like, they yield valuable diaryl derivatives of the anthraquinone series. By subjecting the condensation products containing at least one free α-amino group to the action of amides of carbonic acid, or to the action of esters of acetoacetic or malonic acid anthrapyrimidones and anthrapyridones can be obtained.

The dyestuffs prepared according to the processes cited above are, when they are soluble in water, very valuable dyestuffs for animal fibres such as wool and natural silk. The use of the aromatic amines substituted in both o-positions to the amino group allows to obtain dyestuffs with very pure and brilliant shades and of excellent fastness properties.

One object of the present invention is therefore, the anthraquinone dyestuffs containing in their molecule at least one group

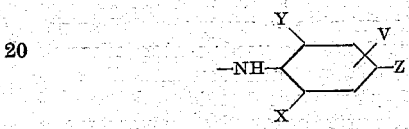

wherein X and Y represent halogen and alkyl, V represents hydrogen and a sulpho group, and Z represents hydrogen, halogen, alkyl and alkoxy, sulpho and a linkage binding two of such groupings together by means of —CH$_2$—, —CHCH$_3$—, —CH— phenyl and by ordinary linkage between the C-atoms of both nuclei.

Another object of the present invention is the process for the manufacture of anthraquinone dyestuffs, consisting in condensing anthraquinone derivatives with the above listed o,o-disubstituted aromatic amines of the benzene series.

Still another object of the present invention is the process for the condensation of the anthraquinone derivatives with the o,o-disubstituted aromatic amines of the benzene series, consisting in that the condensation is carried out in presence of solvents or diluents and catalysts, such as copper or copper salts, and in presence of acid-binding agents and at temperatures between 50° and 250° C.

Still another object of the present invention is the condensation process, wherein as acid-binding agents an excess of the o,o-disubstituted aromatic amines of the benzene series is used.

Still another object of the present invention is the process of transforming the water-insoluble condensation products of anthraquinone derivatives with the o,o-disubstituted aromatic amines into water-soluble dyestuffs by treating them with sulphonating agents, such as sulphuric acid or fuming sulphuric acid or sulphites.

Still another object of the present invention is the process of transforming the condensation products of the anthraquinone series into corresponding anthrapyridones or anthrapyrimidones by treating them with esters of aceto-acetic or malonic acids or with amides of carbonic acid.

Still another object of the present invention is the process for transforming the condensation products of the anthraquinone series obtained as above described into diphenyl-compounds or into diphenyl- and triphenylmethane-compounds of the anthraquinone series, by treating such condensation products that contain a free p-position to the imino group in the nucleus of the o,o-disubstituted aromatic base, with oxidizing agents or with aliphatic or with aromatic aldehydes.

The following examples, without being limitative, illustrate the present invention, the parts being by weight.

*Example 1*

10 parts of C-carbethoxy-2-methyl-4-bromo-anthrapyridone are heated half an hour to 150°–160° C. under stirring with 30 parts of 1-amino-2,4,6-trimethylbenzene, 4 parts of potassium acetate and 0.1 part of copper powder. After the condensation is terminated, the reaction mass is allowed to cool down to about 100° C., diluted with 50 parts of ethanol and allowed to crystallize. The precipitate thereby obtained is filtered, washed first with ethanol and thereon with water and dried.

The intermediate product obtained in this manner is then sulphonated with weak oleum at about 20° C. and the sulphonation mixture poured on ice. The soluble dyestuff thereby obtained is then isolated in the usual manner. It dyes wool a brilliant red-yellow shade of excellent fastness to milling and to perspiration. It possesses the formula

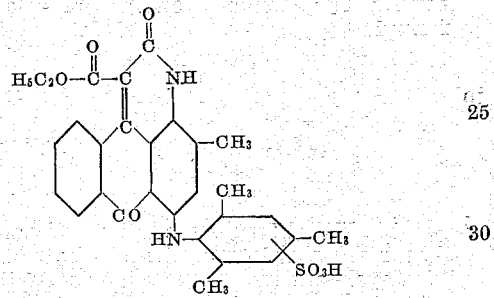

A dyestuff of similar shade can be obtained if the 1-amino-2,4,6-trimethylbenzene is replaced by an equivalent quantity of 1-amino-2,4-dimethyl-6-bromobenzene.

*Example 2*

20 parts of N-methyl-4-bromo-anthrapyridone, 8 parts of potassium acetate, 0.1 part of copper powder and 70 parts of 1-amino-2,6-dimethylbenzene are heated up to 150°–160° C., until the condensation is finished, what generally occurs after 2 to 3 hours. The reaction mixture is then allowed to cool down, diluted with 100 parts of methanol and the precipitated base separated by filtration.

The product thereby obtained is then sulphonated with weak oleum and the dyestuff thereby obtained isolated in the usual manner. It dyes animal fibres scarlet shades of excellent fastnesses and possesses the formula

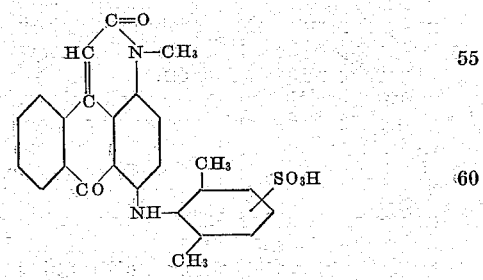

*Example 3*

20 parts of 1-methylamino-4-bromo-anthraquinone are mixed with 6 parts of potassium acetate, 0.1 part of copper powder and 70 parts of 1-amino-2,6-dimethylbenzene and heated up to 158° to 160° C. during 2 to 3 hours. The reaction mass is then allowed to cool down, diluted with 100 parts of methanol and the precipitated condensation product isolated by filtration. The base thereby obtained can be used as dyestuff for lacquers or, when sulphonated with weak oleum, as acid dyestuff which dyes wool brilliant reddish-blue shades with good properties.

The dyestuff thus obtained possesses the formula

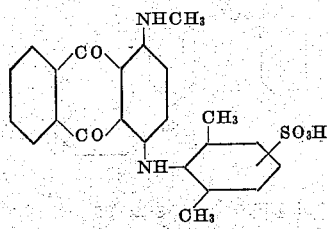

By treating the base above obtained with urea in presence of phenol as solvent, an anthrapyrimidone will be obtained, which on sulphonation yields a water-soluble dyestuff dyeing wool bluish-red shades.

In the same manner dyestuffs from 1-hydroxy-4-bromo-anthraquinone and 1-amino-2,6-dimethylbenzene or other o,o-disubstituted aromatic amines can be prepared.

*Example 4*

10 parts of 1-amino-2-methyl-4-bromo-anthraquinone, 30 parts of 1-amino-2,4,6-trimethylbenzene, 4 parts of potassium acetate and 0.1 part of copper powder are heated up to 150°–160° C., until the condensation is complete and the base thereby produced is then isolated as above described. On sulphonation of the base with oleum, a dyestuff is obtained dyeing wool level and brilliant violet-blue shades of excellent fastness to light and milling. The dyestuff possesses the formula

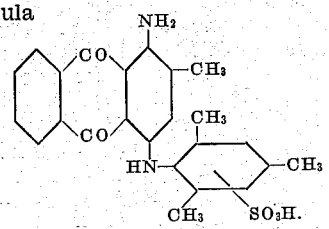

*Example 5*

20 parts of 1,4-dichloro-anthraquinone, 18 parts of potassium acetate, 0.1 part of copper powder and 70 parts of 1-amino-2,6-dimethylbenzene are heated to 170°–180° C., until the shade of the reaction mixture does no more change and after cooling down to about 100° C., the condensation product is isolated in the manner above described.

By sulphonating the base with weak oleum at 40° C. a dyestuff is obtained which dyes wool brilliant reddish-blue shades of excellent fastness to light, milling, perspiration and chromine. Its formula is:

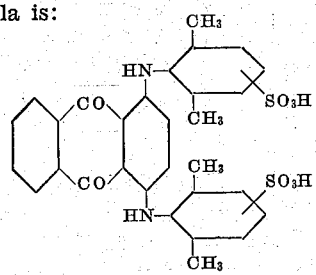

By replacing the 1-amino-2,6-dimethylbenzene by 1-amino-2,4,6-trimethylbenzene, a similar dyestuff will be obtained.

By using 1,5-dichloro-anthraquinone instead of the 1,4-compound, a red dyestuff will be obtained, which gives on wool dyeings of very good fastness to milling and to light.

*Example 6*

20 parts of glacial acetic acid, 22 parts of a concentrated aqueous solution of ammonium hydroxide, 40 parts of water, 20 parts of 1-amino-2,4-dibromoanthraquinone, 0.2 part of copper powder and 100 parts of 1-amino-2,6-dimethylbenzene are heated on a reflux during 24 hours. On dilution with 100 parts of ethanol, the base precipitates in form of violet needles and is isolated.

1 part of this base is heated with 2 parts of an aqueous solution of potassium sulphite (50%) and 4 parts of phenol during 16 hours at 140° C. and after this time phenol is separated from the reaction mixture by blowing it out by means of water steam. The solution thus remaining is then filtered and the dyestuff is salted out.

The dyestuff dyes animal fibres a brilliant reddish-blue shade and possesses the formula

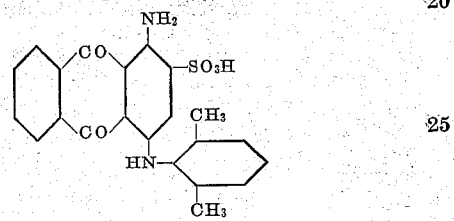

By replacing the 1-amino-2,6-dimethylbenzene by 1-amino-2,4,6-trimethylbenzene, a similar dyestuff will be obtained, which possesses excellent fastness properties. By sulphonating these dyestuffs with sulphuric acid or oleum, new dyestuffs containing two sulpho groups will be obtained. They are easier soluble in water, give redder shades and can be used for printing purposes.

*Example 7*

150 parts of water, 50 parts of ethanol, 20 parts of the sodium salt of 1-amino-4-bromo-anthraquinone-2-sulphonic acid, 10 parts of sodium bicarbonate, 0.2 part of copper powder and 40 parts of 1-amino-2,6-dimethylbenzene are heated together during 10 hours on a boiling water bath. The ethanol and the excess of the aromatic base are thereupon driven off by means of water steam and the dyestuff obtained is precipitated by means of an addition of salt. It is identical with the dyestuff prepared as described in Example 6.

15 parts of this dyestuff are dissolved in 180 parts of sulphuric acid of 93% and partially precipitated by addition of 65 parts of water. To the suspension thus obtained there are added 1.6 parts of a formaldehyde solution of 40% and the mixture is heated for three hours at 80° C. After this time, a test shaken with cold water shows that the dyestuff has become insoluble. The crystalline suspension is then filtered, the precipitate is mixed with a small quantity of water, neutralized with hydroxide of sodium or potassium, filtered and dried. The dyestuff thus obtained dyes wool or natural silk from an acid or neutral dye bath brilliant reddish-blue shades. The wool dyeings possess excellent fastness to milling, washing, potting and to light.

This dyestuff has the following formula:

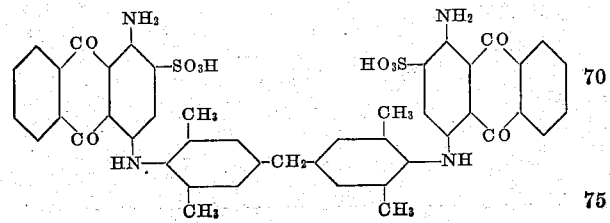

Instead of treating the sulphuric acid solution of the dyestuff with formaldehyde, it is possible to treat it with peroxide of manganese, whereby a diphenyl derivative of the formula

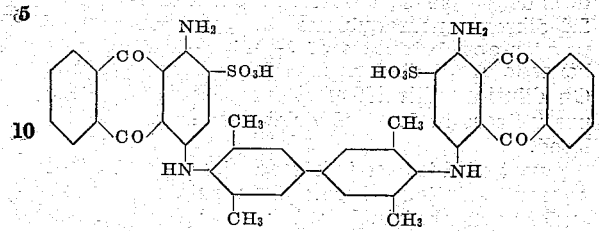

will be obtained. This dyestuff possesses similar properties to those of the diphenylmethane compound, prepared as above described.

*Example 8*

A mixture consisting of 20 parts of ethanol, 19 parts of glacial acetic acid, 24 parts of an aqueous ammonium hydroxide solution ($d=0.91$), 80 parts of 1-amino-6-ethyl-2,4-dimethylbenzene, 20 parts of 1-amino-2,4-dibromo-anthraquinone and 0.2 part of copper powder is heated on a reflux during 24 hours. On dilution with ethanol, the base precipitates in crystallized form. It is then isolated by filtration.

15 parts of this base are dissolved in 45 parts of weak oleum and heated up to 40 to 45° C., until a test shows that it is completely soluble in water. The sulphonation product is then poured on a mixture of ice and sodium chloride solution, and the precipitate thereby obtained is filtered and washed until it has become neutral. The moist paste is then mixed with 30 parts of an aqueous solution of potassium sulphite (50%) and 60 parts of phenol and heated in an autoclave for 16 hours at 110° C. After elimination of phenol by means of distillation with water steam, the solution is filtered and the dyestuff salted out. The dyestuff thereby obtained possesses the formula:

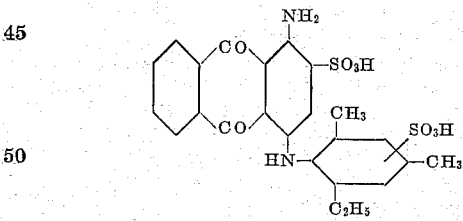

and dyes wool pure blue shades of good properties to washing.

By using as aromatic base the 1-amino-2,4,6-trimethylbenzene a dyestuff possessing a pure but a little redder shade will be obtained.

*Example 9*

20 parts of the sodium salt of 1-amino-2,4-dibromo-anthraquinone-5-sulphonic acid, 5 parts of sodium bicarbonate, 0.2 part of copper powder, 150 parts of water, 50 parts of ethanol and 20 parts of 1-amino-2,4,6-trimethylbenzene are heated on a reflux during 20 hours. The reaction mixture is then distilled with water steam in order to drive off the ethanol and the excess of the aromatic base, and the difficultly soluble dyestuff separated by filtration and washed with salt water.

This dyestuff still in moist state is then mixed with 20 parts of an aqueous solution of potassium sulphite and 50 parts of water and heated under pressure during 16 hours at 140° C. After this time it has been transformed into a better soluble dyestuff of the formula

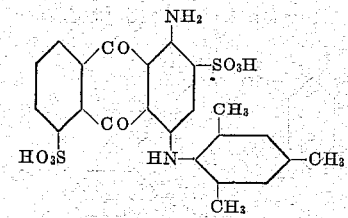

dyeing wool pure blue shades of excellent fastness properties. This dyestuff can also be used in the printing industry as it possesses a very good solubility.

As starting product it is also possible to use the sodium salt of 1-amino-2,4-dibromo-anthraquinone-8-sulphonic acid or the mixture of the isomers sulphonated in the 5- and 8-position.

Similar easily water-soluble blue dyestuffs are obtained by using the sodium salts of 1-amino-2,4-dibromo-anthraquinone-6- or -7-sulphonic acid or the mixture of both isomers.

*Example 10*

20 parts of a technical mixture containing the potassium salts of 1-amino-4-bromo-anthraquinone-2,5-disulphonic acid and 1-amino-4-bromo-anthraquinone-2,8-disulphonic acid, 5 parts of sodium bicarbonate, 0.2 part of copper powder, 150 parts of water, 50 parts of ethanol and 20 parts of 1-amino-2,4,6-trimethylbenzene are heated on a reflux during 24 hours and the dyestuff thereby formed is precipitated by an addition of hydrochloric acid. The precipitate is then filtered and worked up in the usual manner. It dyes wool blue shades of good fastness properties.

*Example 11*

20 parts of 1-amino-2-sulpho-4-bromo-anthraquinone, 10 parts of sodium bi-carbonate, 0.2 part of copper powder, 50 parts of ethanol, 20 parts of 1-amino-2,4,6-trimethylbenzene and 150 parts of water are heated together under stirring at 70° C. until the formation of the dyestuff has occurred. Ethanol and the excess of the aromatic base are thereupon distilled off with water steam, and the dyestuff, which precipitates thereby in crystallized form, is filtered. By dissolving it in water and acidulating its aqueous solution with sulphuric acid, it can be precipitated in pure form. It dyes wool brilliant well levelling blue shades of excellent fastness to washing and to light and possesses the formula:

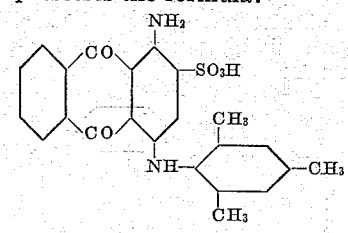

*Example 12*

14 parts of the dyestuff prepared according to Example 3 from 1-methylamino-4-bromo-anthraquinone and 1-amino-2,6-dimethylbenzene are dissolved in 180 parts of concentrated sulphuric acid and precipitated by means of an addition of 57 parts of water. The suspension is then stirred first for several hours at normal temperature, then for 2 hours at 40–60° C. with 7.5 parts of the crystallized sodium salt of benzaldehyde disulphonic acid, and the reaction mixture poured into 500 parts of water. The precipitate thereby obtained is filtered, suspended in 1000 parts of water, heated to the boil and filtered from some of the unreacted starting product. The dyestuff is then salted out and isolated by filtration. It is soluble in water with a blue coloration and dyes wool from an acid bath blue shades of good fastness to milling and to perspiration. Its formula is:

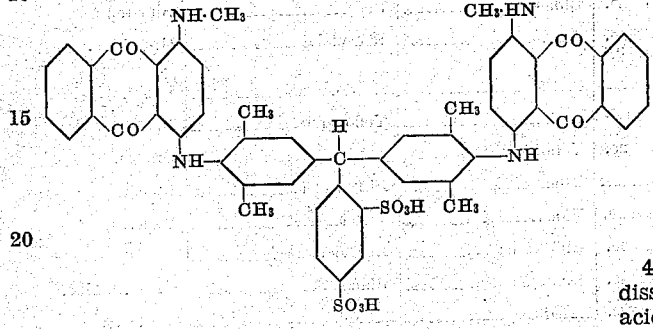

In a similar manner it is possible to transform the condensation product obtained according to Example 4 from 1-amino-2-methyl-4-bromo-anthraquinone and 1-amino-2,6-dimethylbenzene into a water-soluble violet dyestuff of the formula:

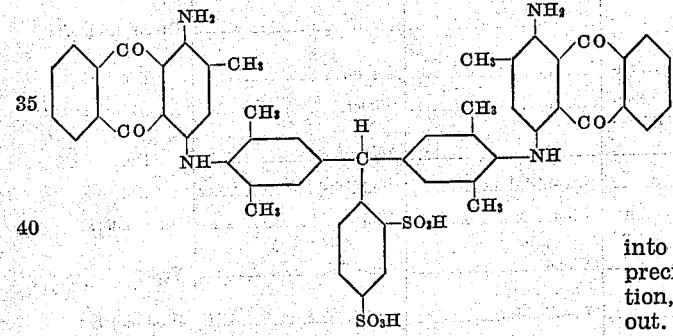

Example 13

10 parts of the condensation product obtained according to Example 6 from 1-amino-2,4-di-bromo-anthraquinone and 1-amino-2,6-dimethyl-benzene are dissolved in 60 parts of sulphuric acid of 80% and heated during 4 hours at 60° C. and under good stirring with 4.5 parts of the sodium salt of benzaldehyde disulphonic acid (cryst.). The reaction mixture is thereupon poured into 500 parts of water, the precipitated dyestuff separated by filtration, redissolved in water, neutralized and salted out. The dyestuff thereby obtained dyes wool blue violet shades of very good fastness properties and possesses the formula:

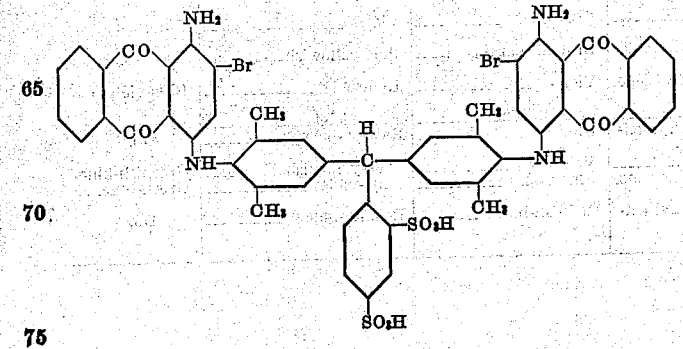

Example 14

C=acetyl-2,4-dibromo-anthrapyridone is condensed with 1-amino-2,6-dimethylbenzene in the manner described in Example 1 and the base thereby obtained transformed into the 2-sulphonic acid derivative by heating it with a concentrated potassium sulphite solution and phenol for 16 hours at 140° C.

4 parts of the dyestuff thereby obtained are dissolved in 35 parts of concentrated sulphuric acid and the solution is cooled down to −6° C. At this temperature are slowly added 0.6 part of peroxide of manganese of 70%. The temperature is then allowed to rise up to 0° C. and the reaction mixture is allowed to stand over night at ordinary temperature. The reaction mixture is then heated for a short time at 40° C. and poured into cold water, whereby the produced dyestuff precipitates. The dyestuff is separated by filtration, redissolved in water, neutralized and salted out.

The new dyestuff dissolves in water with blue-red coloration and dyes wool blue red tints of good fastness to light and to milling. Its formula is:

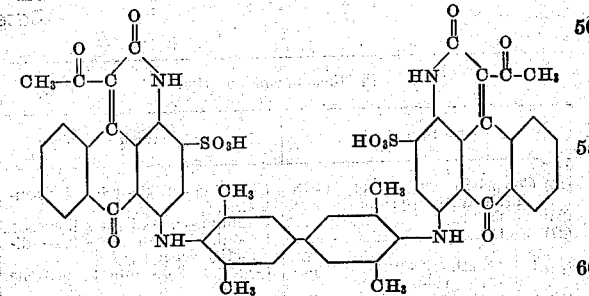

The coloration of the solutions of the dyestuffs in different solvents is shown by the following table:

Dyestuffs

| Products of condensation | | Coloration of their solution in | | +Boric acid |
|---|---|---|---|---|
| From | With | Water | Sulphuric acid | |
| (1) C-carbethoxy-2-methyl-4-bromo-anthrapyridone. | 1-amino-2,4,6-trimethylbenzene, sulphonated. | Blue-red | Red | Blue-red. |
| (2) C-acetyl-2,4-dibromo-anthrapyridone. | 1-amino-2,6-dimethylbenzene, the 2-bromine replaced by SO₃H. | ___do___ | Red-violet | Grey-blue. |
| (3) C-carbethoxy-2,4-dibromo-anthrapyridone. | ___do___ | ___do___ | ___do___ | Violet. |
| (4) C-carbethoxy-2-methyl-4-bromo-anthrapyridone. | 1-amino-2-bromo-4,6-dimethylbenzene, sulphonated. | Red | Yellow-red | Red. |
| (5) N-methyl-4-bromo-anthrapyridone. | 1-amino-2,6-dimethylbenzene, sulphonated. | Yellow-red | Orange | Orange. |
| (6) 1-methylamino-4-bromo-anthraquinone. | ___do___ | Blue | Blue-violet | Blue. |
| (7) 1-amino-2-methyl-4-bromo-anthraquinone. | 1-amino-2,6-dimethylbenzene, sulphonated. | Violet | Violet | Violet. |
| (8) Do | 1-amino-2,4,6-trimethylbenzene, sulphonated. | Blue-violet | Red-violet | Do. |
| (9) 1,4-dichloro-anthraquinone | 1-amino-2,6-dimethylbenzene, sulphonated. | Blue | Blue | Greenish-blue. |
| (10) Do | 1-amino-2,4,6-trimethylbenzene, sulphonated. | ___do___ | ___do___ | Do. |
| (11) 1,5-dichloro-anthraquinone | ___do___ | Blue-red | Pale-blue | Blue. |
| (12) 1-amino-2,4-dibromo-anthraquinone. | 1-amino-2,6-dimethylbenzene, the 2-bromine replaced by SO₃H. | Blue | Blue | Greenish-blue. |
| (13) 1-amino-2-sulpho-4-bromo-anthraquinone. | 1-amino-2,4,6-trimethylbenzene | ___do___ | ___do___ | Blue. |
| (14) Do | 1-amino-2,6-dimethylbenzene, condensed with formaldehyde. | ___do___ | ___do___ | Do. |
| (15) Do | 1-amino-2,6-dimethylbenzene, oxidized to the diphenyl derivative. | ___do___ | ___do___ | Do. |
| (16) 1-amino-2,4-dibromo-anthraquinone. | 1-amino-2-ethyl-4,6-dimethylbenzene, sulphonated and the 2-bromine replaced by SO₃H. | ___do___ | ___do___ | Greenish-blue. |
| (17) 1-amino-2-sulpho-4-bromo-anthraquinone. | 1-amino-2,4,6-trimethylbenzene, sulphonated. | ___do___ | ___do___ | Do. |
| (18) 1-amino-5-sulpho-2,4-dibromo-anthraquinone. | 1-amino-2,4,6-trimethylbenzene, the 2-bromine replaced by SO₃H. | ___do___ | Violet | Reddish-blue. |
| (19) 1-amino-8-sulpho-2,4-dibromo-anthraquinone. | ___do___ | ___do___ | Pale-violet | Do. |
| (20) 1-amino-6-sulpho-2,4-dibromo-anthraquinone. | ___do___ | Greenish-blue | Reddish-blue | Do. |
| (21) 1-methylamino-4-bromo-anthraquinone (Example 12). | 1-amino-2,6-dimethylbenzene, condensed with benzaldehyde-disulphonic acid. | Blue | Violet | Blue-violet. |
| (22) 1-amino-2-methyl-4-bromo-anthraquinone (Example 12a). | ___do___ | Violet | Red-violet | Violet. |
| (23) 1-amino-2,4-dibromo-anthraquinone (Example 13). | ___do___ | Reddish-blue | Blue-violet | Blue-violet. |
| (24) C-acetyl-2,4-dibromo-anthrapyridone (Example 14). | 1-amino-2,6-dimethylbenzene, the 2-bromine replaced by SO₃H, oxidized by MnO². | Blue-red | Red-violet | Grey. |

Bases

| Products of condensation | | Solution of the base in | | +Formaldehyde |
|---|---|---|---|---|
| From | With | Benzene | Sulphuric acid | |
| (25) C-carbethoxy-2-methyl-4-bromoanthrapyridone. | 1-amino-2,4,6-trimethylbenzene. | Red | Bordeaux-red | Red. |
| (26) Do | 1-amino-2,6-dimethylbenzene | ___do___ | ___do___ | Yellow-red. |
| (27) Do | 1-amino-6-bromo-2,4-dimethylbenzene. | Yellow-red | ___do___ | Do. |
| (28) C-carbethoxy-2,4-dibromo-anthrapyridone. | 1-amino-2,6-dimethylbenzene | Red | Blue-red | Red. |
| (29) N-methyl-4-bromo-anthrapyridone. | ___do___ | Yellow-red | Brown-orange | Unchanged. |
| (30) 1-methylamino-4-bromo-anthraquinone. | ___do___ | Blue | Violet | Blue. |
| (31) 1-amino-5-chloro-anthraquinone. | 1-amino-2,4,6-trimethylbenzene. | Brownish-orange | Pale-yellowish | Green-blue. |
| (32) 1-amino-2-methyl-4-bromo-anthraquinone. | 1-amino-2,6-dimethylbenzene | Violet | Red-violet | Blue-violet. |
| (33) 1,4-dichloro-anthraquinone | ___do___ | Reddish-blue | Blue-violet | Blue. |
| (34) Do | 1-amino-2,4,6-trimethylbenzene. | Blue | Reddish-blue | Do. |
| (35) 1,5-dichloroanthraquinone | ___do___ | Yellow-red | Pale-yellowish | Greenish-blue. |
| (36) 1-amino-2,4-dibromo-anthraquinone. | 1-amino-2,6-dimethylbenzene | Blue-violet | Blue-violet | Green-blue. |
| (37) Do | 1-amino-2,4,6-trimethylbenzene. | Reddish-blue | Reddish-blue | Do. |

What I claim is:
1. A process for the manufacture of anthraquinone dyestuffs, comprising condensing anthraquinone compounds containing in an α-position at least one member of the group consisting of halogen, nitro, alkoxy and hydroxy with an aromatic amine of the general formula

wherein X stands for a member of the group consisting of methyl and ethyl, Y stands for a member of the group consisting of methyl, ethyl and halogen, and Z stands for a member of the group consisting of hydrogen and methyl.

2. A process for the manufacture of anthraquinone dyestuffs, comprising condensing anthraquinone compounds containing in an α-position at least one member of the group consisting of halogen, nitro, alkoxy and hydroxy, in presence of a solvent and diluting agent, with an aromatic amine of the general formula

wherein X stands for a member of the group consisting of methyl and ethyl, Y stands for a member of the group consisting of methyl, ethyl and halogen, and Z stands for a member of the group consisting of hydrogen and methyl.

3. A process for the manufacture of anthraquinone dyestuffs, comprising condensing anthraquinone compounds containing in an α-position at least one member of the group consisting of halogen, nitro, alkoxy and hydroxy, in presence of a solvent and a diluting agent and copper as catalyst, with an aromatic amine of the general formula

wherein X stands for a member of the group consisting of methyl and ethyl, Y stands for a member of the group consisting of methyl, ethyl and halogen, and Z stands for a member of the group consisting of hydrogen and methyl.

4. A process for the manufacture of anthraquinone dyestuffs, comprising condensing anthraquinone compounds containing in an α-position at least one member of the group consisting of halogen, nitro, alkoxy and hydroxy, in presence of a solvent and a diluting agent, of copper as catalyst and of an acid-binding agent, at a temperature between 50° and 250° C., with an aromatic amine of the general formula

wherein X stands for a member of the group consisting of methyl and ethyl, Y stands for a member of the group consisting of methyl, ethyl and halogen, and Z stands for a member of the group consisting of hydrogen and methyl.

5. A process for the manufacture of anthraquinone dyestuffs, comprising condensing sulphonated anthraquinone compounds containing at least one halogen atom in an α-position with an aromatic amine of the general formula:

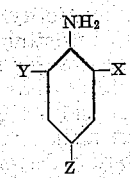

wherein X stands for a member of the group consisting of methyl and ethyl, Y stands for a member of the group consisting of methyl, ethyl and halogen, and Z stands for a member of the group consisting of hydrogen and methyl, and performing the condensation in presence of a solvent and a diluting agent, of copper as catalyst and of an acid-binding agent at a temperature of 50° to 250° C.

6. A process for the manufacture of anthraquinone dyestuffs, comprising condensing an anthraquinone derivative of the general formula

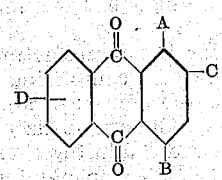

wherein A represents a member of the group consisting of hydrogen, halogen, amino and methylamino, B represents halogen, C represents a member of the group consisting of hydrogen, halogen, alkyl and sulpho, and D represents a member of the group consisting of hydrogen, halogen and a sulpho group, with an aromatic amine of the general formula

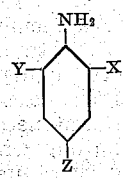

wherein X stands for a member of the group consisting of methyl and ethyl, Y stands for a member of the group consisting of methyl, ethyl and halogen, and Z stands for a member of the group consisting of hydrogen and methyl.

7. A process for the manufacture of anthraquinone dyestuffs, comprising condensing sulphonated anthraquinone compounds of the general formula:

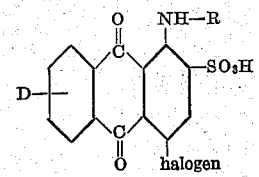

wherein R represents a member of the group consisting of hydrogen and methyl and D represents a member of the group consisting of hydrogen, halogen, and sulphonic acid group, with an aromatic amine of the general formula:

wherein X stands for a member of the group consisting of methyl and ethyl, Y stands for a member of the group consisting of methyl, ethyl and halogen, and Z stands for a member of the group consisting of hydrogen and methyl and performing the condensation in presence of a solvent and a diluting agent, of copper as catalyst and of an acid-binding agent at a temperature of 50° to 250° C.

8. A process for the manufacture of an anthraquinone dyestuff, comprising condensing 1-amino-2-sulpho-4-bromo-anthraquinone with 1-amino-2,4,6-trimethylbenzene in presence of a solvent and a diluting agent, of copper as catalyst and of an acid-binding agent at a temperature of 50° to 110° C.

9. A process for the manufacture of an anthraquinone dyestuff, comprising condensing 1-amino-2-sulpho-4-bromo-anthraquinone with 1-amino-2,6-dimethylbenzene in presence of a solvent and a diluting agent, of copper as a catalyst and of an acid-binding agent at a temperature of 50° to 110° C.

10. A process for the manufacture of an anthraquinone dyestuff, comprising condensing 1-amino-2-sulpho-4-bromo-anthraquinone with 1-amino-2-ethyl-4,6-dimethylbenzene in presence of a solvent and a diluting agent, of copper as a catalyst and of an acid-binding agent at a temperature of 50° to 110° C.

11. The anthraquinone dyestuffs containing in an α-position at least once in their molecule the grouping

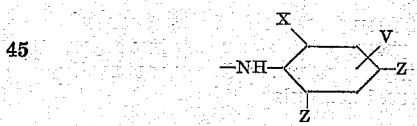

wherein X stands for a member of the group consisting of methyl and ethyl, Y stands for a member of the group consisting of methyl, ethyl and halogen, Z stands for a member of the group consisting of hydrogen and methyl, and V represents a member of the group consisting of hydrogen and sulpho, said dyestuffs being valuable compounds for dyeing lacquers and cellulose esters and ethers and in case they are soluble in water being suitable for dyeing animal fibres.

12. The anthraquinone dyestuffs of the general formula:

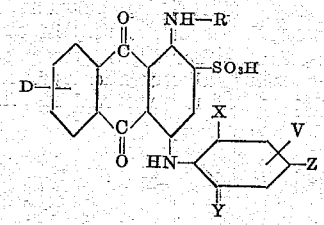

wherein R represents a member of the group consisting of hydrogen and methyl, D represents a member of the group consisting of hydrogen, halogen, and sulpho, X represents a member of the group consisting of methyl and ethyl, Y represents a member of the group consisting of methyl, ethyl and halogen, Z represents a member of the group consisting of hydrogen and methyl, and V represents a member of the group consisting of hydrogen and sulpho, said dyestuffs being in dry state dark powders soluble in water with blue coloration and dyeing animal fibres blue shades.

13. The anthraquinone dyestuff of the formula:

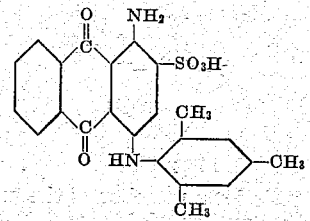

14. The anthraquinone dyestuff of the formula

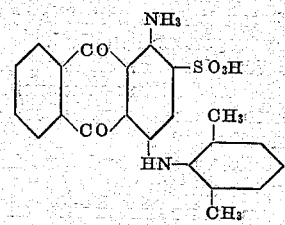

15. The anthraquinone dyestuff of the formula

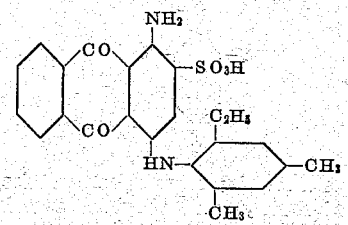

ALBIN PETER.